United States Patent [19]

Cross et al.

[11] Patent Number: 5,017,004
[45] Date of Patent: May 21, 1991

[54] MULTIFUNCTION ELECTRO-OPTICAL SYSTEM TEST TOOL

[75] Inventors: Michael A. Cross, Severna Park; Edward W. Nichols, Reisterstown, both of Md.

[73] Assignee: Westinghouse Electric Corp., Pittsburgh, Pa.

[21] Appl. No.: 288,387

[22] Filed: Dec. 22, 1988

[51] Int. Cl.$^5$ ............................................... G01J 1/00
[52] U.S. Cl. ................................................ 356/121
[58] Field of Search ................... 356/121; 358/213.19, 358/213.25, 213.26

[56] References Cited

U.S. PATENT DOCUMENTS

| | | | |
|---|---|---|---|
| 3,601,488 | 8/1971 | Ripart | 356/5 |
| 3,800,078 | 3/1974 | Cochran et al. | 178/7.1 |
| 3,946,151 | 3/1976 | Kamiyama et al. | 178/7.1 |
| 3,949,162 | 4/1976 | Malueg | 178/7.1 |
| 3,992,615 | 11/1976 | Bennett et al. | 356/5 |
| 4,068,952 | 1/1978 | Erbert et al. | 356/5 |
| 4,079,423 | 3/1978 | Diehl | 358/167 |
| 4,121,890 | 10/1978 | Braun | 356/5 |
| 4,141,040 | 2/1979 | Dischert et al. | 358/160 |
| 4,142,213 | 2/1979 | Glenn | 358/221 |
| 4,167,755 | 9/1979 | Nagumo | 358/213 |
| 4,189,749 | 2/1980 | Hiroshima et al. | 358/167 |
| 4,320,462 | 3/1982 | Lund et al. | 356/121 |
| 4,693,600 | 9/1987 | Cross et al. | 356/121 |
| 4,875,100 | 10/1989 | Yonemoto et al. | 358/213.19 |

OTHER PUBLICATIONS

EG&G Reticon Technical Sheets (no date).

Primary Examiner—Richard A. Rosenberger

[57] ABSTRACT

An electro-optical test tool for testing an input laser beam includes a collecting optics system of attenuating and collimating lenses enabling the test tool to test high powered, high PRF laser sources. A processor controlled CCPD sensor array provides a shuttered laser beam video signal which can be processed using a non-linear technique to improve the dynamic range of the system. Additionally, boresight error correcting capabilities are provided as well as range finding techniques.

18 Claims, 5 Drawing Sheets

MULTIFUNCTION ELECTRO-OPTICAL SYSTEM TEST TOOL

BACKGROUND OF THE INVENTION

The present invention relates to an electro-optical system test tool and more particularly to a multifunction electro-optical system test tool capable of providing high resolution output information for high power and high pulse repetition frequency (PRF) laser optic devices.

A conventional electro-optical test tool is described, for example, in U.S. Pat. No. 4,693,600, which is hereby incorporated by reference. The optical beam analyzer described therein, includes an optical system for collecting a light beam to be analyzed and an array of light sensitive elements positioned at the focal plane of the optical system for receiving the incident light beam. The array is scanned so as to sequentially sample the incident light beam and the sampled information is then digitally processed to generate signals indicative of the characteristics of the incident light beam.

FIG. 1 shows a schematic diagram of such a conventional electro-optical test tool. The incident laser beam from the laser under test 1 is collected by a collecting optics arrangement 3 and made incident upon a focal plane at which is disposed a sensor array 4. The sensor array 4 may comprise a linear array of 1024 photodiodes. The incident laser beam is also partially reflected by reflector 2 to a detector 5 which outputs an initiate data scan signal (sync signal) to a scan-timing circuit 7. In response, the scan-timing circuit 7 supplies control signals to a video data processor 8 and an A/D converter 9. In response to the control signal, the video data processor 8 sequentially selects sensors of the sensor array 4 and couples the output signal of each selected sensor to the A/D converter 9.

In response to the control signal from the scan-timing circuit 7 and the output signal from the video data processor 8, the A/D converter 9 generates a digital number representative of the output signal of the selected sensor and outputs the digital number, along with an interrupt signal, to a digital processor 10. When the interrupt signal has been generated, the digital processor 10 outputs a scan control signal to scan control circuit 11. In response, the scan control circuit 11 generates output signals which are coupled to a positioning system 12 to sequentially move, in predetermined increments, the linear sensor array in the focal plane of the collecting optics 3 such that a selected area of the focal plane is scanned. In this manner, data in the form of digital numbers is generated and stored in a memory (not shown) which may be part of the processor 10, and is displayed on display device 13 for providing an energy profile of a scanned portion of the laser beam entering the collecting optics 3.

While this conventional optical beam analyzer provides an effective testing tool, it suffers from a number of performance limiting disadvantages. In particular, this conventional analyzer cannot effectively test a pulsed optical source having a pulse repetition frequency (PRF) greater than 100 hz. Furthermore, the processing circuitry is incapable of processing laser radiation pattern details corresponding to low level video information which limits the dynamic range of the testing device.

SUMMARY OF THE INVENTION

In view of the foregoing disadvantages of conventional optical beam analyzers, an object of the present invention is to provide a multifunction electro-optical system test tool capable of testing high power and high PRF laser sources.

Another object of the present invention is to provide a multifunction electro-optical system test tool having a wide dynamic range for detecting and processing signals of laser radiation pattern characteristics.

A further object of the present invention is to provide a multifunction electro-optical system test tool capable of detecting small amounts of laser beam divergence.

An additional object of the present invention is to provide a multifunction electro-optical system test tool capable of measuring laser to video tracking boresight errors and for providing ranging capabilities.

To achieve these and other objects and in accordance with the purpose of the invention, as embodied and broadly discussed herein, the present invention provides a multifunction electro-optical test tool for testing a laser beam of a system under test, comprising: an electronic shutter device for sensing the laser beam and outputting a video signal corresponding thereto; a collecting optics system for receiving the laser beam and translating the laser beam to the electronic shutter device; a shutter controller for controlling the electronic shutter device to substantially instantaneously sample the incident laser beam; and a signal processor for nonlinearly processing the video signal.

BRIEF DESCRIPTION OF THE DRAWINGS

The accompanying drawings which are incorporated in and constitute a part of the specification, illustrate an embodiment of the invention and, together with the description, serve to explain the principles of the invention. The objects and features of the present invention will become apparent from the description of the preferred embodiments taken in conjunction with the accompanying drawings, wherein.

DESCRIPTION OF THE PREFERRED EMBODIMENT

Figure 1:
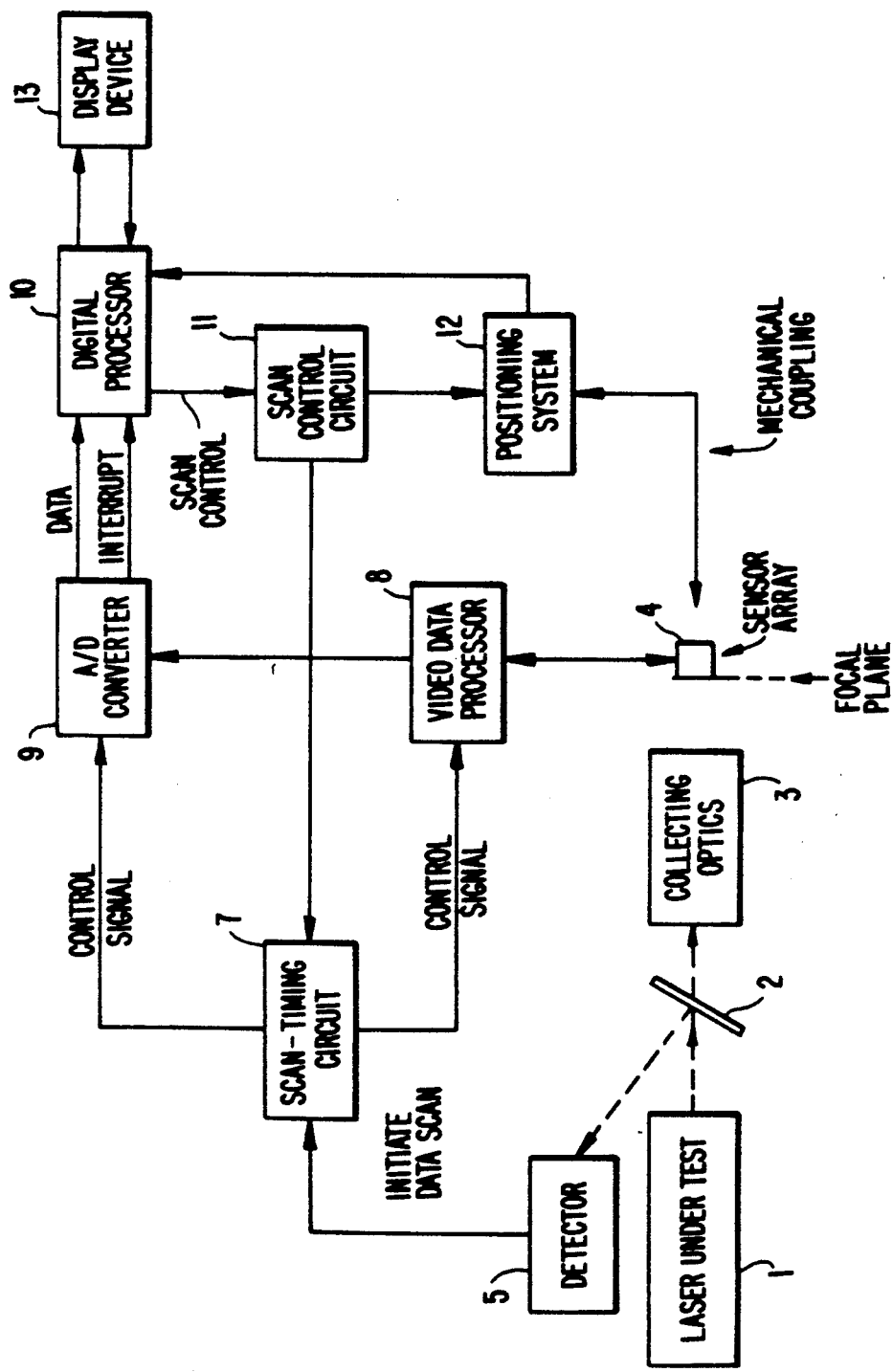
FIG. 1 is a schematic representation of a conventional optical beam analyzer.
Figure 2:
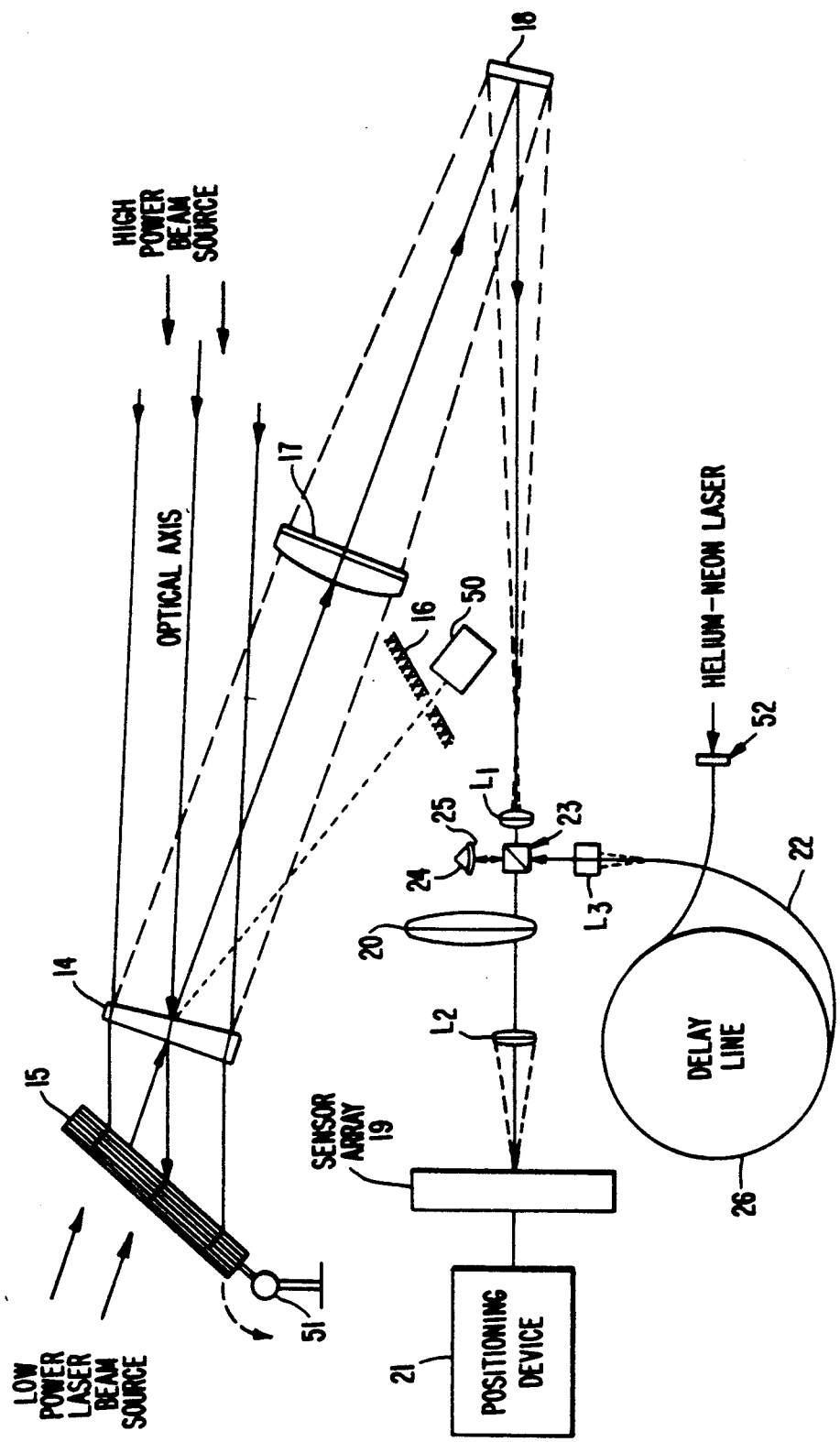
FIG. 2 is a schematic diagram of a multifunction electro-optical system test tool in accordance with the present invention.

FIG. 2 shows a multifunction electro-optical system test tool according to the present invention. The system includes a collecting optics system, a sensor array configuration and a boresighting/delay line configuration. The collecting optics system includes an uncoated wedged beam splitter 14, a bulk absorber 15, a black absorber 16, a laser firing detector 50, a collecting lens 17, an absorbing reflector 18, and relay lenses $L_1$ and $L_2$. The collecting optics system receives an incident laser beam from a laser beam source (the system under test) and focuses the same onto the sensor array 19 located at the focal plane of the collecting optics. The collecting optics system enables the present invention to test high power laser beams because the system provides a great deal of attenuation to the input laser beam. In particular, the uncoated wedged beam splitter 14 functions as a reflective attenuator by reflecting only part of the input laser beam from a first side thereof to be used as the sampled laser beam. The portion of the laser beam passing through the wedged beam splitter 14 is absorbed in the bulk absorber 15, which may be density tapered to provide uniform energy dissipation throughout. The combination of the wedged beam splitter 14 and tapered bulk absorber 15 enables the system to accurately test both high power and high PRF laser sources. Further, partial reflection from the second side of the wedged beam splitter 14 falls upon the laser firing detector 50 and black absorber 16. The present invention can also be used conveniently with low power laser beam sources. Reference numeral 51 corresponds to a pivotable support structure which allows bulk absorber 15 to pivot out of the input path of a low power laser beam source.

The portion of the laser beam reflected by the wedged beam splitter 14 is focused by the collecting lens 17 toward the absorbing reflector 18, which absorbs additional laser beam energy and reflects the laser beam toward the sensor array 19. Further, the absorbing reflector 18 folds the optical path to enable compactness of the testing tool. It will be recognized by those skilled in the art that while only one fold is shown in FIG. 2, a plurality of absorbing reflectors could be provided to further fold and/or attenuate the laser beam.

A filter wheel 20 is provided between relay lenses $L_1$ and $L_2$ to enable coarse and fine attenuation adjustments of the incident laser beam by filters contained therein. A positioning device 21 is connected to the sensor array 19 and provides scanning of the sensor array 19 in a manner appropriate to sample the incident laser beam. The positioning device may be similar to any conventional positioning device 21 capable of providing the desired scan.

The relay lens configuration of $L_1$ and $L_2$ facilitates the addition of an automatic boresighting configuration for correcting laser to video tracking boresight error, as well as a fiber optic delay line for range simulation. In addition, relay lenses $L_1$ and $L_2$ increase the EFL of the system to permit measurement of small beam divergences.

With respect to the boresighting feature, an optical fiber 22 is disposed at the focal point of a lens $L_3$ and is backlighted with, for example, a helium-neon laser. A cube type beam splitter 23, located between the relay lenses $L_1$ and $L_2$, folds the emergent backlighting rays from the optical fiber 22 onto the optical axis of the collecting optics A corner cube retro-reflector 24 is provided on the opposite side of the cube type beamsplitter 23 so that emergent rays from the optical fiber 22 travel in opposite directions along the optical axis of the collecting optics (i.e., light is reflected toward the sensor array 19 and toward the input laser beam source) to generate a boresight reference on the image plane of the sensor array 19 and at the input laser beam source. Generally, a system under test, which corresponds to the input laser beam source of FIG. 2, includes image forming capabilities (for example, a video tracker) which can receive the reflected light from the optical fiber to be used as a positioning reference to define the optical axis of the whole system. In operation, the reference light is adjusted to lie on the video tracker AZ/EL intercept and the centroid location of the light from the optical fiber 22 on the sensor array 19 is computed. The laser beam is then fired and its centroid location on the sensor array 19 is also computed. The difference in centroid coordinates establishes the magnitude of the boresight error, relative to the video tracker intercepts. A low power correcting lens 25 may be installed in front of the retro-reflector 24 in case the collecting optics system requires different focal adjustments for near and far fields of the boresight feature.

With respect to the delay line feature, the optical fiber 22 may comprise a lengthy optical fiber with a terminal reflector 52 at one end for reflecting light back to the laser beam source. Fiber-optic delay lines are known for providing ranging capabilities and therefore it will be apparent to those of ordinary skill that any conventional or suitable fiber-optic delay line can be used for these range finding purposes. If no range calibration is required, the lengthy optical fiber may be replaced with a short optical fiber to provide more efficient backlighting from the helium-neon laser.

The sensor array 19 of the present invention differs from that used in the foregoing conventional device in order to overcome the disadvantages thereof. In particular, the present invention employs a charge-coupled photo diode (CCPD) array which, in combination with the signal processing technique described below, enables an expanded dynamic range and compatibility with high PRF laser sources.

Figure 3:
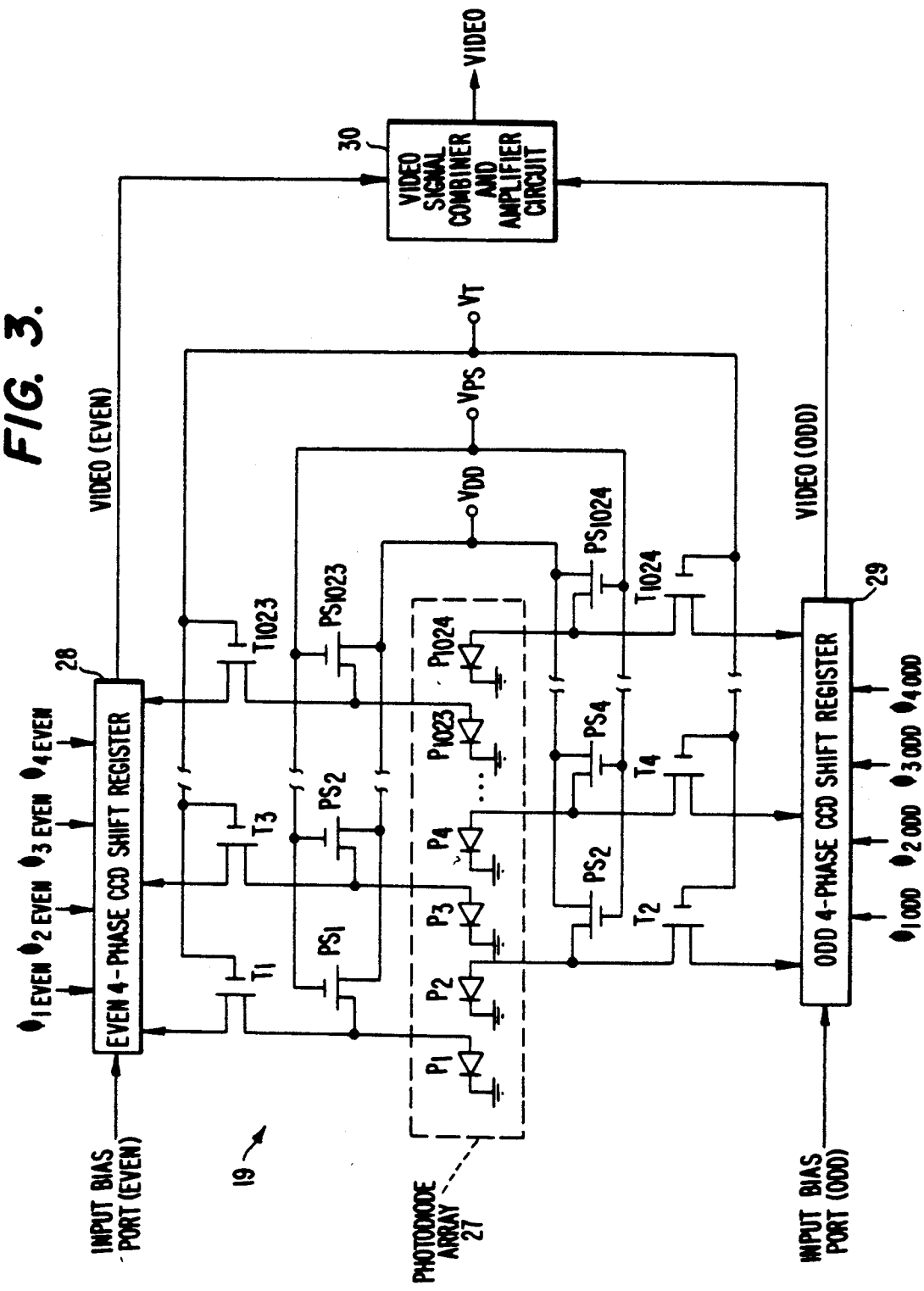
FIG. 3 is a schematic diagram of an integrated sensor array utilized in the present invention.

CCPD sensing arrays are known to the art and those of ordinary skill will recognize that any suitable CCPD array can be employed as the sensor array 19. As embodied herein, the CCPD comprises the RETICON CCPD-1024 shown in FIG. 3. The RETICON CCPD-1024 is an integrated micro circuit containing photodiode array 27 which includes diodes $P_1, P_2, P_3, P_4 \ldots P_{1023}$ and $P_{1024}$ having 0.0006 inch spacing. Such close spacing facilitates measurement of small beam divergences. The photodiodes are grouped as ODD and EVEN for ease of processing. Each photodiode is connected to the source of an anti-blooming FET which is utilized in the present invention as a precharge switch $PS_1, PS_2, PS_3, PS_4, \ldots PS_{1023}$ and $PS_{1024}$. The precharge switch FETs have their drain electrodes connected to a voltage supply $V_{DD}$ and their gate electrodes connected to a precharge switch potential $V_{PS}$. Each photodiode $P_1$-$P_{1024}$ is also connected to the source terminal of a transfer gate FET, $T_1, T_2, T_3, T_4, \ldots T_{1023}$ and $T_{1024}$. The drain electrodes of the transfer gates are connected to respective ODD or EVEN 4-phase CCD shift registers 28 and 29 and the gate electrodes are connected to a transfer potential source $V_T$.

In operation, the precharge switches are held on and the transfer switches are held off which renders the sensor in an inoperative state. To activate the sensor, the precharge switches are turned off which exposes the sensor to the incident light beam modifying the charge on the photodiodes. This in effect allows the array sensor 19 to operate as an electronic shutter for taking an instantaneous sample of the incident laser beam. The transfer switches are then momentarily pulsed on which dumps the acquired signals to the respective CCD shift registers 28 and 29. This operates functionally to close the electronic shutter to complete the sample of the input laser beam. Finally, the detected signals are serially shifted out of the respective CCD shift registers 28 and 29 by the 4-phase clock pulses $\phi_1$ EVEN/ODD - $\phi_4$ EVEN/ODD to the Video signal combiner and amplifier circuit 30. The video signal combiner and amplifier circuit 30 combines the separately acquired EVEN and ODD video signals into a combined video signal which includes an intensity level of the input laser beam for each of the photodiodes scanned. This particular feature of the present invention enables the system to operate with pulse laser sources having very high PRFs. Specifically, since an instantaneous sample of the input laser beam is sensed and shifted out independent of its acquisition, the continued pulsation of the pulse laser source does not interfere with the data extraction.

Figure 5:
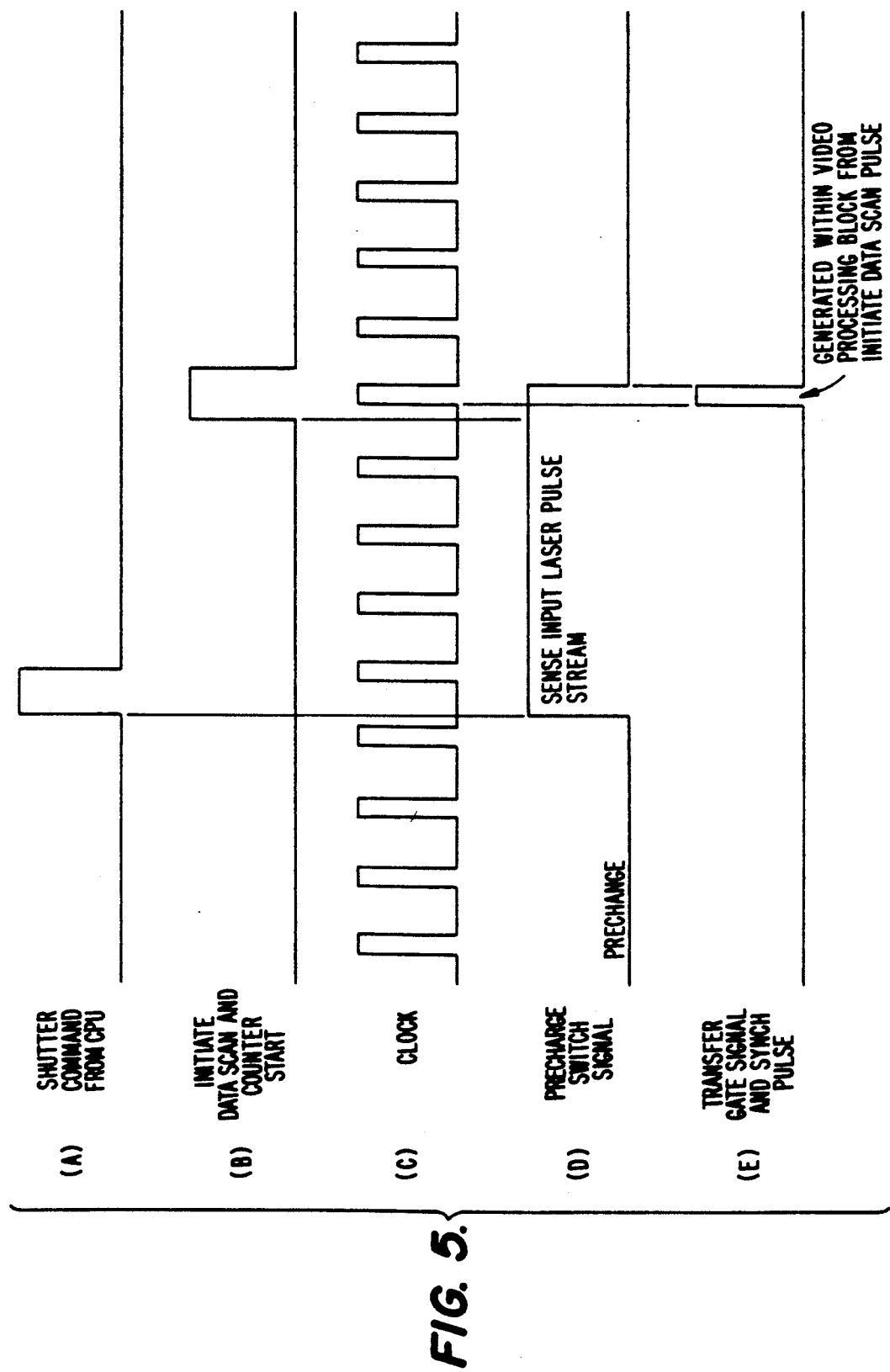
FIG. 5 is a timing diagram corresponding to the operation of the sensor array and circuitry shown in FIG. 4.

The specific sensor array scanning and electronic shutter function will now be described with reference to FIGS. 4 and 5 which show a schematic diagram of the control circuitry and signal processing circuitry of the present invention and a related timing diagram, respectively. The system is initiated by detection of a laser beam by a laser firing detector 32. An output signal from the laser firing detector 32 may be amplified by a preamp 33 and output to a start pulse generator 34. Start pulse generator 34 receives a clock signal from a free-running clock 35 and an output signal from a shutter pulse generator 36. A timing function of CPU 42 outputs a shutter command signal to the shutter pulse generator 36 (FIG. 5A). In response, the shutter pulse generator 36 outputs a precharge shutter signal (FIG. 5D) to a video processor 37 which is applied to the precharge switch of each photodiode of the sensor array 19. As described above, this turns off the precharge switch and allows the sensor array to sample the input laser pulse stream. After a selected number of clock pulses, start pulse generator 34 generates an initiate data scan signal which is coupled to video processor 37 and binary counter 38 (FIG. 5B). The video processor 37 includes a motherboard and interface circuitry (not shown) for controlling the sensor array 19, as well as circuitry corresponding to the video signal combiner and amplifier circuit 30 shown in FIG. 3.

In response to the initiate data scan signal the video processor 37 generates a transfer gate signal (FIG. 5E) which, as described above, is applied to the transfer switches of each photodiode of the sensor array 19, to dump the sampled signal to the respective CCD shift register. The same transfer switch signal is applied to the shutter pulse generator 36 as a synch pulse to stop the output of the precharge switch signal and corresponding sampling by the sensor.

Binary counter 38 receives an output from a scale selector function circuit 39 and the free-running clock 35 to provide output signals indicating different scan rates for outputting the sampled information from the video processor 37 corresponding to selected portions of the sensor array 19 at different rates. In particular, a control signal is output to either the fast right shift circuit 40 or the slow data clock 41 at a predetermined count of the binary counter 38 corresponding to a select portion of the sensor array 19. The output of the fast-right shift cirucit 40 or slow data clock 41 provides the S/R clock signal for the video processor 37. This variable sensor array scanning feature is programmable by the CPU 49 which provides a scan size signal through a binary decoder 43 to the scale selector function circuit 39.

A further advantage of the electronic shuttering feature of the present invention is that it can be utilized to facilitate sampling of inter-pulse background noise, including stray radiation, fixed pattern and dark current noise. Specifically, the CPU 42 outputs a darkscan command signal to the start pulse generator 34. In response, the start pulse generator 34 initiates the video processor 37 to scan the sensor array 19 while no laser pulse is incident thereon. The sampled information corresponds to background noise of the sensor array 19. The sampled information is stored in a memory of the video processor 37 (not shown) and is subtracted from subsequently sampled laser information by the noise subtraction function of the CPU 42. Further, the sensor array 19 may be scanned several times when no laser beam is incident thereon and the average-pattern may be stored in the memory. This averaged pattern may then be used to subtract the noise information from the acquired data, thereby improving the system dynamic range.

The useful dynamic range of the present testing tool is expanded over conventional devices by utilizing a non-linear processing technique. Generally, the useful dynamic range of conventional signal processing circuitry is limited by the resolution of the A/D convertor therein. However, the analog video signal of the present system may be processed in such a manner that low level signals are amplified more than high level signals such that the low level signals are not lost in passing through the A/D converter.

Figure 4:
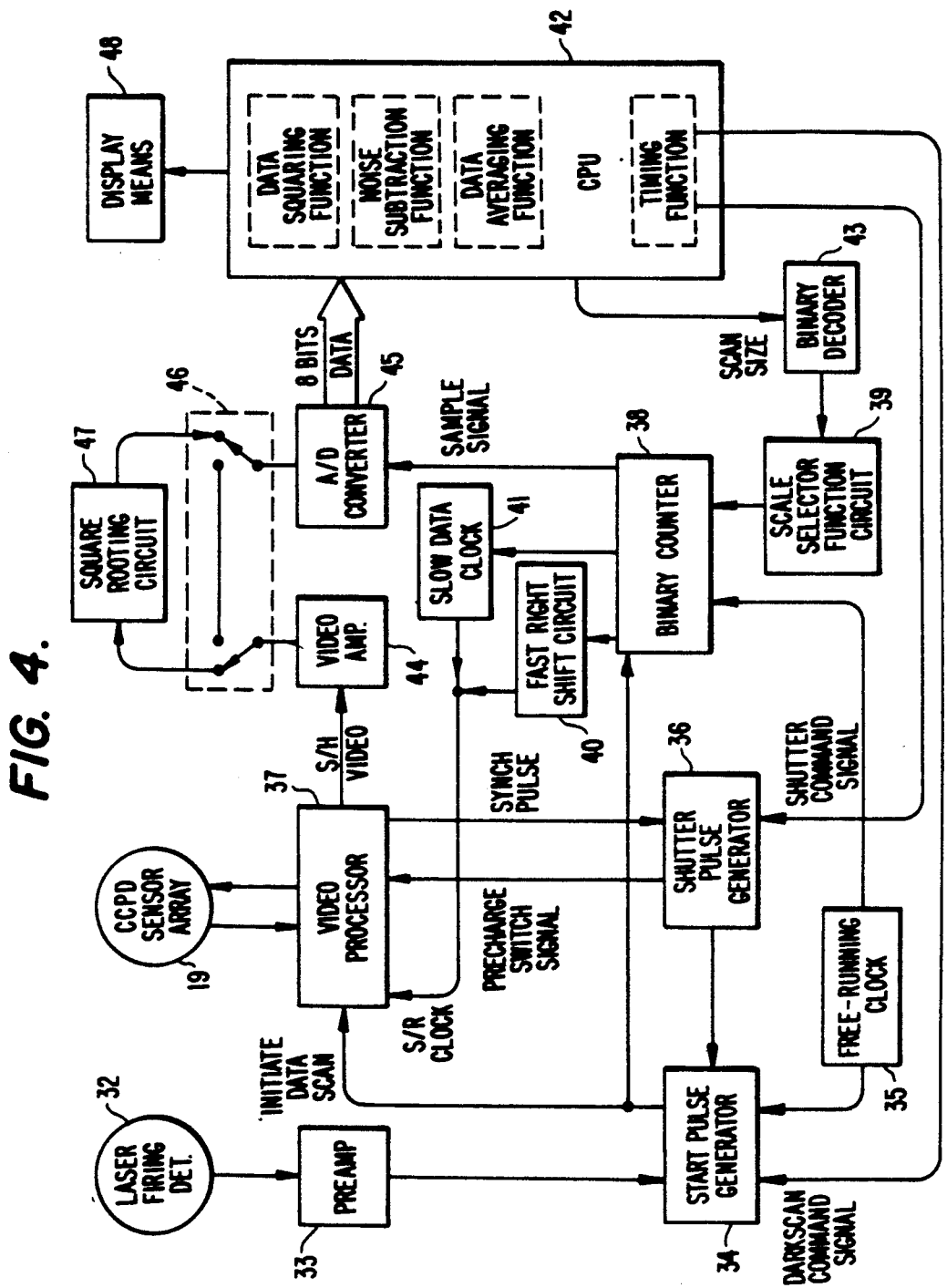
FIG. 4 is a schematic diagram of the control circuitry and signal processing circuitry associated with the present invention.

As shown in FIG. 4, video amplifier 44 is switchably connected to A/D converter 45 by a switching configuration 46. The switching configuration 46 shown is manually activated and allows the video signal output by the video processor to be fed either directly to the A/D converter 45 or first to a square rooting circuit 47. While the switching configuration 46 is shown to be manual, it would be within the scope of the present invention to include a switching circuit controlled by the CPU 42 to provide automatic switching. In operation, when it is desired to perform non-linear signal processing, an operator causes the switch to pass the voltage signals to the square rooting circuit 47 which outputs an analog signal proportional to the square root of its input to provide a non-linear output signal. This non-linear output signal is then A/D converted in response to a sample signal generated by the binary counter 38. In this manner, the A/D converter 45 processes both high input video signals and low input video signals so as to expand the dynamic range of the signal processing. The digital output of the A/D converter 45 is re-squared by a data squaring function of the CPU 42 to accurately represent the original video signal. Finally, the processed video signal is output to a display means 48 to allow an observer to interpret the data corresponding to the input laser beam.

The multifunction electro-optical system test tool of the present invention enables testing of both low and high powered laser sources having high PRFs. The noise subtraction and non-linear signal processing promotes expanded dynamic range. Further, use of long EFI optics and a photodiode array on 0.0006 centers increases image resolution for small beam divergence measurement. Furthermore, the collective optics system and fiber-optic delay line configuration provide both boresight error correction capabilities and delay line ranging capabilities, respectively.

While the present invention has been described in terms of the foregoing embodiments, it should be understood that numerous modifications may be made thereto without departing from the spirit and scope of the invention and it is intended that the present invention covers the modifications and variations of the system provided that come within the scope of the appended claims and their equivalents.

What is claimed is:

1. An electro-optical testing apparatus for testing a laser beam with a pre-determined pulse repetition frequency (PRF) of a system under test, comprising:

collecting optics means for receiving said laser beam and translating said laser beam along an optical axis and including attenuating means for attenuating said laser beam and relay means for increasing the effective focal length of said collecting optics means;

boresight error measuring means disposed in the optical axis of said laser beam for measuring boresight error of said system under test;

rangefinding means disposed in the optical axis for receiving said laser beam for range simulation and rangefinding of said system under test;

electronic shutter means disposed at a focal point of the optical path for sensing said laser beam, said shutter means being operative to output a video signal corresponding to the sensed beam;

shutter control means responsive to the pulse repetition frequency (PRF) of the sensed laser beam for effectively opening and closing said electronic shutter means in synchronization with the PRF of the pulsed laser beam for operating said shutter means to output a video signal corresponding to each pulse of the sensed beam; and signal processing means for non-linearly processing said video signal.

2. An electro-optical testing apparatus according to claim 1, wherein said boresight error measuring means includes:

a backlight source;

a lens configuration for translating said backlight to said electronic shutter means and said system under test; and an optical fiber for relaying said backlight from said backlight source to said lens configuration.

3. An electro-optical testing apparatus according to claim 2, wherein said optical fiber comprises a delay line for receiving said laser beam, translated thereto by said lens configuration, for range finding testing.

4. An electro-optical testing apparatus according to claim 1, wherein said attenuating means includes a wedged beam-splitter and a bulk light absorber.

5. An electro-optical testing apparatus according to claim 1 comprising focusing means including a focusing lens and at least one folding reflector.

6. An electro-optical testing apparatus according to claim 1, wherein said relay means includes a plurality of relay lenses.

7. An electro-optical testing apparatus according to claim 6, further comprising a rotating wheel-filter disposed between said plurality of relay lenses.

8. An electro-optical testing apparatus according to claim 1, wherein said electronic shutter means comprises:

a charge coupled photodiode sensor array; and a positioning means for scanning said charge coupled photodiode sensor array across said laser beam.

9. An electro-optical testing apparatus according to claim 1, wherein said shutter control means includes means for sampling noise components of said electronic shutter means when no laser beam is incident thereon.

10. An electro-optical testing apparatus according to claim 9, wherein said shutter control means comprises a processor means and a shutter pulse generator.

11. An electro-optical testing apparatus according to claim 10, wherein said processor means includes means for subtracting said noise components from said video signal.

12. An electro-optical testing apparatus for testing a laser beam with a pre-determined pulse repetition frequency (PRF) of a system under test, comprising:

collecting optics means for receiving said laser beam and translating said laser beam along an optical axis and including attenuating means for attenuating said laser beam;

electronic shutter means disposed at a focal point of the optical axis for sensing said laser beam, said electronic shutter means being operative to output a video signal corresponding to the sensed beam;

shutter control means responsive to the pulse repetition frequency (PRF) of the sensed laser beam for effectively opening and closing said electronic shutter means in synchronization with the PRF of the pulsed laser beam for operating the electronic shutter means to output a video signal corresponding to each pulse of the sensed beam; and signal processing means for non-linearly processing said video signal, the signal processing means including means for amplifying low level video signals more than high level video signals, means for converting both said low and high level video signals into digital signals, and means for linearizing said digital signals.

13. A method of generating a video signal of an incident laser beam using a charge-coupled photodiode sensor array including a plurality of photodiodes, each of said photodiodes being connected to a precharge switch and a transfer switch and each of said transfer switches being connected to one of at least two CCD shift registers, comprising the steps of:

turning off said precharge switches to expose said photodiodes to said incident laser beam;

momentarily turning on said transfer switches to transfer signals output by said photodiodes to a corresponding one of said CCD shift registers;

serially shifting said signals out of said CCD shift registers;

combining said signals into a combined video signal representing an image of said incident laser beam; and processing said combined video signal in a non-linear manner, including the substeps of calculating the square root of said combined video signal, converting said calculated combined video signal into a digital signal, and squaring the digital signal to linearize said digital signal.

14. A method according to claim 13, further comprising the steps of:

turning off said precharge switches when no laser beam is incident on said charged-coupled photodiode sensor array;

momentarily turning on said transfer switches to transfer noise signals output by said photodiodes to said corresponding CCD shift registers;

combining said noise signals into a combined noise signal; and subtracting said combined noise signal from said video signal to obtain a video signal corresponding to said incident laser beam.

15. An electro-optical testing apparatus for testing a laser beam with a pre-determined pulse repetition frequency (PRF) of a system under test, comprising:
- collecting optics means for receiving said laser beam and translating said laser beam along an optical axis;
- electronic shutter means for sensing said laser beam and outputting a video signal corresponding thereto;
- shutter control means for controlling said electronic shutter means; and
- signal processing means for non-linearly processing said video signal, wherein said signal processing means includes:
- means for amplifying low level video signals more than high level video signals,
- means for converting both said low and high level video signals into digital signals,
- means for linearizing said digital signals.

16. An electro-optical testing apparatus according to claim 15, wherein said signal processing means comprises a processor means.

17. An electro-optical testing apparatus according to claim 15, wherein said means for amplifying includes a switch and a square rooting circuit for outputting the square root of an input video signal when said switch directs said video signal thereto.

18. A method of generating a video signal of an incident laser beam using a charge-coupled photodiode sensor array including a plurality of photodiodes, each of said photodiodes being connected to a precharge switch and a transfer switch and each of said transfer switches being connected to one of at least two CCD shift registers, comprising the steps of:
- turning off said precharge switches to expose said photodiodes to said incident laser beam;
- momentarily turning on said transfer switches to transfer signals output by said photodiodes to a corresponding one of said CCD shift registers;
- serially shifting said signals out of said CCD shift registers;
- combining said signals into low and high level video signals representing an image of said incident laser beam; and
- processing said combined video signals including the substeps of amplifying the low level video signals more than the high level video signals, converting both said low and high level video signals into digital signals, and linearizing said digital signals.

* * * * *